United States Patent
Achtner et al.

(10) Patent No.: US 10,423,911 B2
(45) Date of Patent: Sep. 24, 2019

(54) SYSTEM FOR PLATFORM ACTIVITY GATHERING FOR ACHIEVEMENT LEVERAGING VIRTUAL VISUALIZATION

(71) Applicant: BANK OF AMERICA CORPORATION, Charlotte, NC (US)

(72) Inventors: Edward J. Achtner, Kentfield, CA (US); Caitlin Chrisman Bullock, Mountain View, CA (US); Nitu Nanda, Union City, CA (US); Natalie Elizabeth Tolles, San Francisco, CA (US); Suma Nagappa Kumaraswamy, Santa Clara, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 198 days.

(21) Appl. No.: 15/463,449

(22) Filed: Mar. 20, 2017

(65) Prior Publication Data
US 2018/0203583 A1 Jul. 19, 2018

Related U.S. Application Data

(60) Provisional application No. 62/448,187, filed on Jan. 19, 2017.

(51) Int. Cl.
| | |
|---|---|
| *H04L 29/08* | (2006.01) |
| *G06Q 10/06* | (2012.01) |
| *G06Q 50/00* | (2012.01) |
| *G06F 16/9535* | (2019.01) |
| *H04L 29/06* | (2006.01) |
| *H04L 12/911* | (2013.01) |
| *G06F 3/0482* | (2013.01) |

(52) U.S. Cl.
CPC ... *G06Q 10/06315* (2013.01); *G06F 16/9535* (2019.01); *G06Q 10/0631* (2013.01); *G06Q 10/06313* (2013.01); *G06Q 50/01* (2013.01); *H04L 47/70* (2013.01); *H04L 63/10* (2013.01); *H04L 67/22* (2013.01); *H04L 67/306* (2013.01); *G06F 3/0482* (2013.01); *Y04S 10/54* (2013.01)

(58) Field of Classification Search
CPC combination set(s) only.
See application file for complete search history.

(56) References Cited

U.S. PATENT DOCUMENTS

| | | |
|---|---|---|
| 5,696,961 A | 12/1997 | Briscoe et al. |
| 6,269,343 B1 | 7/2001 | Pallakoff |
| 6,430,542 B1 * | 8/2002 | Moran ............ G06Q 30/02 705/35 |
| 6,714,967 B1 | 3/2004 | Horvitz |
| 7,216,002 B1 | 5/2007 | Anderson |

(Continued)

*Primary Examiner* — Hien L Duong
(74) *Attorney, Agent, or Firm* — Michael A. Springs; Moore & Van Allen PLLC; Nicholas C. Russell

(57) ABSTRACT

Embodiments of the invention are directed to a system, method, or computer program product for extraction and utilization of user activity across networks platforms for achievement prediction and leveraging. As such, the user network activity is identified and paired with user information. Utilizing the network activity and user information the system dynamically generates a virtual visualization simulation. This virtual visualization simulation trends achievements and illustrates future user simulations based on user network activity and actions.

20 Claims, 10 Drawing Sheets

(56) References Cited

U.S. PATENT DOCUMENTS

| | | |
|---|---|---|
| 7,668,747 B2 | 2/2010 | Murphy et al. |
| 7,672,897 B2 | 3/2010 | Chung et al. |
| 7,702,687 B2 | 4/2010 | Govindarajan et al. |
| 8,010,418 B1 | 8/2011 | Lee |
| 8,150,416 B2 | 4/2012 | Ribaudo et al. |
| 8,301,495 B2 | 10/2012 | Mason |
| 8,402,387 B1 | 3/2013 | Iversen |
| 8,611,326 B2 | 12/2013 | Huang |
| 8,631,414 B2 | 1/2014 | Gargash et al. |
| 8,700,711 B2 | 4/2014 | Travis et al. |
| 8,930,204 B1 | 1/2015 | Igoe et al. |
| 9,092,211 B2 | 7/2015 | Ng et al. |
| 9,154,564 B2 | 10/2015 | Heidt et al. |
| 9,223,832 B2 | 12/2015 | Hamborg et al. |
| 9,336,332 B2 | 5/2016 | Davis et al. |
| 9,355,172 B2 | 5/2016 | Howes et al. |
| 9,369,536 B1 | 6/2016 | Holtzclaw et al. |
| 9,531,808 B2 | 12/2016 | Singh et al. |
| 2006/0294112 A1 | 12/2006 | Mandato et al. |
| 2007/0244777 A1* | 10/2007 | Torre ............... G06Q 40/00 705/35 |
| 2007/0255655 A1 | 11/2007 | Kemper et al. |
| 2009/0300195 A1 | 12/2009 | Devdhar |
| 2011/0208681 A1* | 8/2011 | Kuecuekyan ......... G06N 20/00 706/21 |
| 2012/0283855 A1* | 11/2012 | Hoffman ............... G01C 21/20 700/91 |
| 2013/0073366 A1* | 3/2013 | Heath ............... G06Q 30/0261 705/14.25 |
| 2013/0073473 A1* | 3/2013 | Heath ............... G06Q 30/02 705/319 |
| 2013/0290458 A1 | 10/2013 | Morris et al. |
| 2014/0025654 A1 | 1/2014 | Brown |
| 2014/0067834 A1 | 3/2014 | Hutten |
| 2014/0074978 A1 | 3/2014 | Yu |
| 2014/0207518 A1* | 7/2014 | Kannan ............... G06Q 30/0201 705/7.29 |
| 2014/0207561 A1 | 7/2014 | Dandekar et al. |
| 2015/0038806 A1* | 2/2015 | Kaleal, III ........... A61B 5/4872 600/301 |
| 2015/0127728 A1 | 5/2015 | Marti et al. |
| 2015/0149631 A1 | 5/2015 | Lissack |
| 2015/0221036 A1 | 8/2015 | Sharma et al. |
| 2015/0332179 A1 | 11/2015 | Vergano |
| 2016/0042364 A1 | 2/2016 | Zamer et al. |
| 2016/0110591 A1 | 4/2016 | Smith et al. |
| 2016/0125426 A1 | 5/2016 | Francolla et al. |
| 2016/0171063 A1 | 6/2016 | Kiciman et al. |
| 2016/0171557 A1 | 6/2016 | Fanous et al. |
| 2016/0267601 A1 | 9/2016 | Kundu |
| 2016/0292794 A1 | 10/2016 | Sedayao |
| 2016/0321328 A1 | 11/2016 | Duckworth et al. |
| 2016/0357173 A1* | 12/2016 | Foschini ............... G06F 19/30 |
| 2017/0132688 A1 | 5/2017 | Freund et al. |
| 2017/0147775 A1* | 5/2017 | Ohnemus ............... G16H 50/30 |
| 2017/0161439 A1* | 6/2017 | Raduchel ............ G06Q 10/063 |
| 2017/0220926 A1* | 8/2017 | Chhabra ................ G06N 3/08 |
| 2017/0289168 A1* | 10/2017 | Bar .................... H04L 63/0853 |
| 2017/0289302 A1 | 10/2017 | Chander |
| 2017/0330274 A1 | 11/2017 | Conant, II |
| 2018/0026904 A1 | 1/2018 | Van De Groenendaal et al. |
| 2018/0060972 A1 | 3/2018 | Scott |
| 2018/0096308 A1 | 4/2018 | Roseman et al. |
| 2018/0196880 A1* | 7/2018 | Carter .................... H04L 67/18 |

* cited by examiner

SYSTEM FOR PLATFORM ACTIVITY GATHERING FOR ACHIEVEMENT LEVERAGING VIRTUAL VISUALIZATION

CLAIM OF PRIORITY UNDER 35 U.S.C. § 119

This Non-Provisional patent application claims priority to Provisional Application No. 62/448,187 titled "System for Integration of Social Media Platform For Resource Distribution" filed Jan. 19, 2017, assigned to the assignee hereof and hereby expressly incorporated by reference herein.

BACKGROUND

Customers today desire entities to provide services through multiple electronic and digital channels. With an increase in the adaptation of a variety of channels integrated into almost all facets of everyday living, entities have the capability to deliver faster and more effective mechanism for user interaction.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In some embodiments of the invention, the invention leverages data gathered regarding user activity to predict future user activity. In this way, the system gathers information associated with the user's social media activity, such as articles that he/she reads, posts liked, and the like. The system also gathers information associated with the user. For example, age, education, employment information, interests, hobbies, financial information, or the like. Accordingly, the system may determine whether the user's social media activity is indicative of someone who may pursue an interest shown by them on social media. For example, if the user is a 60 year old person who has been looking at retirement homes in the southwest, the system may determine a likelihood of the user actually going through with the purchase of a retirement home in the southwest. Accordingly, the system may provide recommendations to the user along the same lines. In this case, the recommendations may be similar retirement facilities in the southwest or equivalent locations. Furthermore, using this information and leveraging peer users' information, the system generates a life priority guidance tool which provides recommendations to the user on how best achieve their lifestyle priorities. This tool may be able to provide the user with answers to questions such as, "what do people like me do to afford a house like this?", "what do people like me do to get into this particular profession?" Furthermore, the system uses this information, specifically the user's social media activity, their indicated lifestyle priorities, and their financial information to provide additional purchase options. For example, if the user has indicated that their lifestyle priority is to reduce their carbon footprint, based on their financial information and social media. Furthermore, the system uses predictive analysis for advertising. In this regard, the present invention generates an avatar that looks like you X years in the future. The system may gather information associated with the user (e.g., lifestyle priorities, financial information, purchasing habits), and provide an outlook of how the user may be X years from now if the user maintains the same or similar course. The system may also provide recommendations about what the user can do in the next X years and show them what they can be if they implemented the recommendations. The avatar may be generated to dynamically vary based on their actions between now and X years. In this way, the present invention may make subtle suggestions to guide the user to plan their future. For example, if the user is going to too many movies and spending XX each time, your future self can say something like, "I see you're spending a bunch of time at the movies, maybe you should stop going so often and spend that money on mortgage for the house."

Embodiments of the invention relate to systems, methods, and computer program products for network platform activity leverage virtual visualization alteration, the invention comprising: identifying user activity across network platforms; extracting user activity across network platforms and categorize the user activity; pairing extracted user activity across network platforms with user information; leveraging user activity across network platforms and user information for identification of user trends; generating a virtual visualization simulator for user access via a secure communication portal illustrating the user at a predetermined future time, wherein the virtual visualization simulator illustrates the user based on the user activity across network platforms and user information; receiving one or more inputs from the user via a user interface communicated via the secure communication portal; and adjusting the virtual visualization simulator for illustration of the inputs.

In some embodiments, the invention further comprising extracting priority event data for the one or more user peers that obtained a priority event and adjusting the virtual visualization simulator to illustrate steps required by the one or more user peers to achieve the priority event.

In some embodiments, the invention further comprising updating categorization of the user activity based on a monitoring of the user activity across network platforms using network monitoring modules.

In some embodiments, identifying user activity across network platforms further comprises identifying user posts and likes on one or more social media platforms. In some embodiments, user information further comprises user age and interests.

In some embodiments, receiving one or more inputs from the user further comprises an indication of a user future priority event, wherein the user priority event is an activity or location the user desires to obtain in the future.

In some embodiments, the virtual visualization simulator further comprises an avatar of the user in a future setting at a predetermined future time simulating the user based on the user activity across network platforms and user information.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
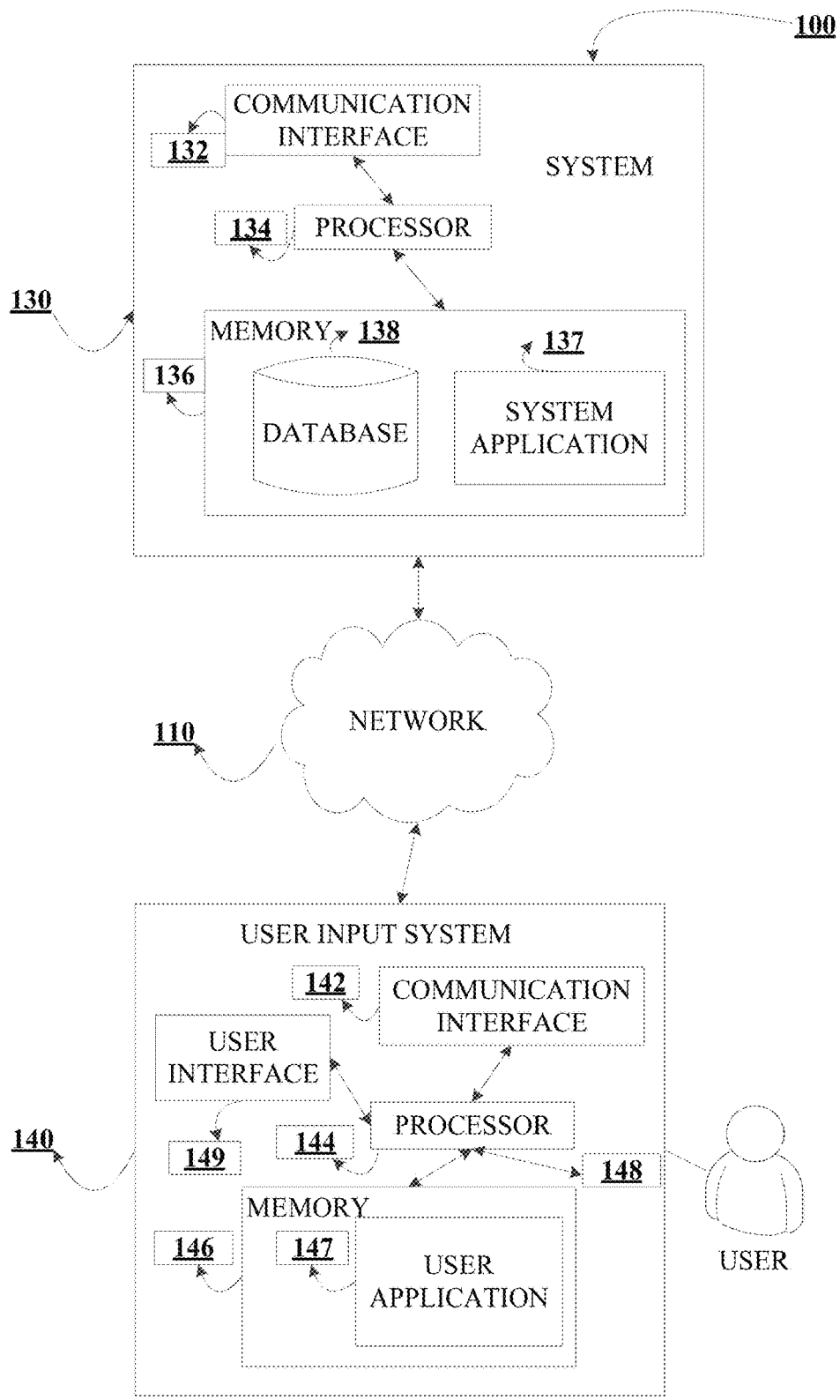
Figure 2:
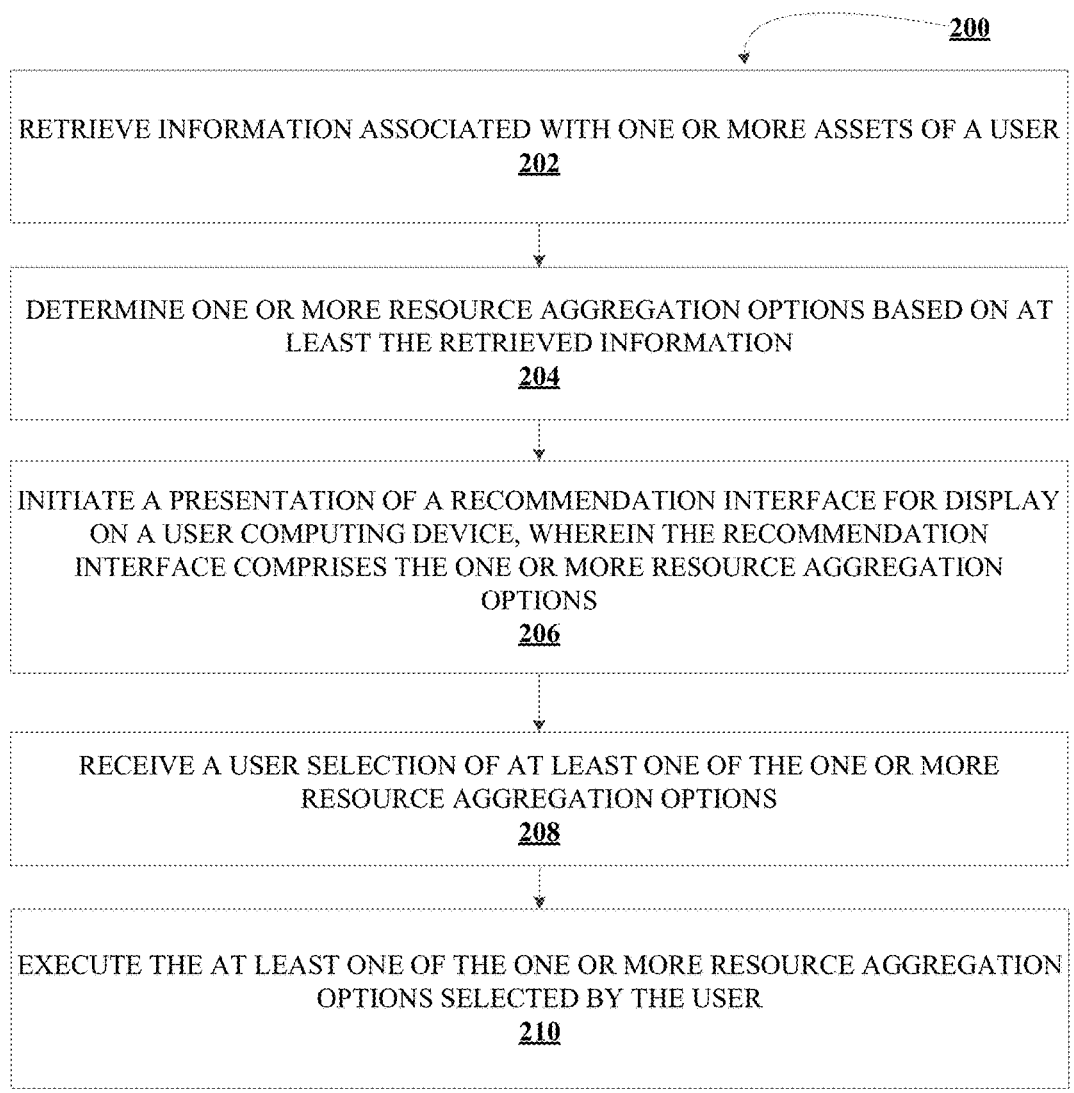
Figure 3:
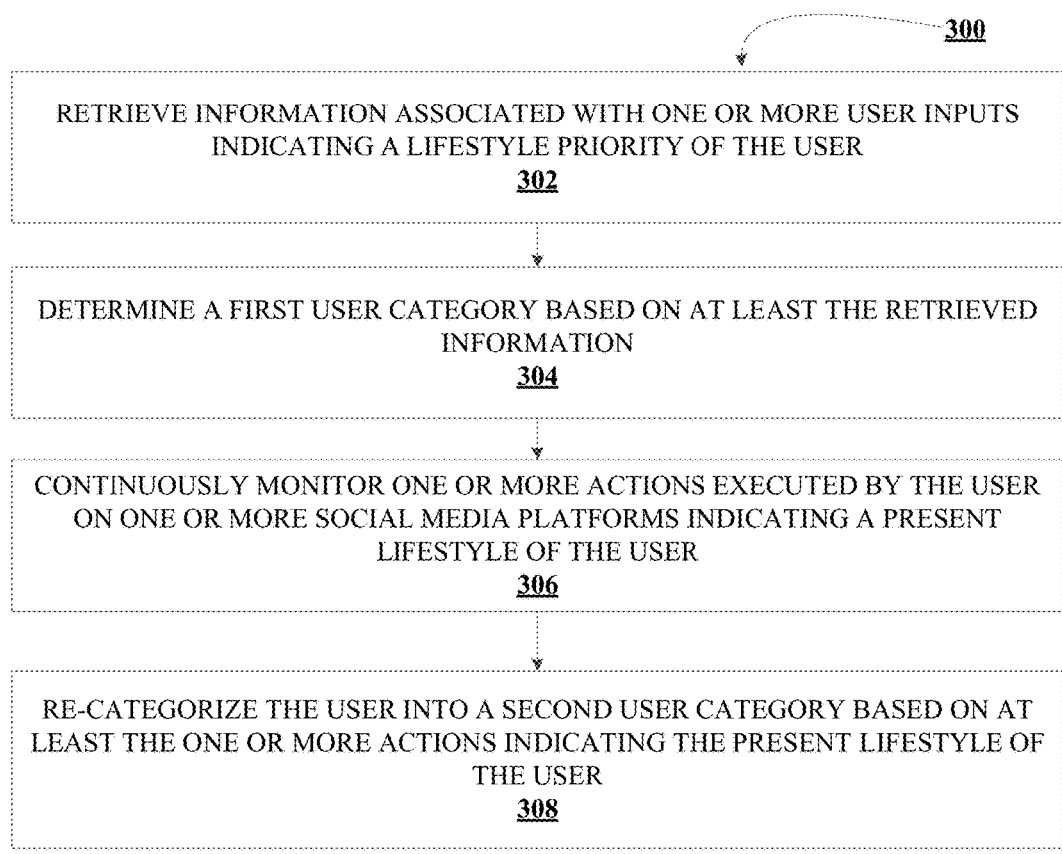
Figure 4:
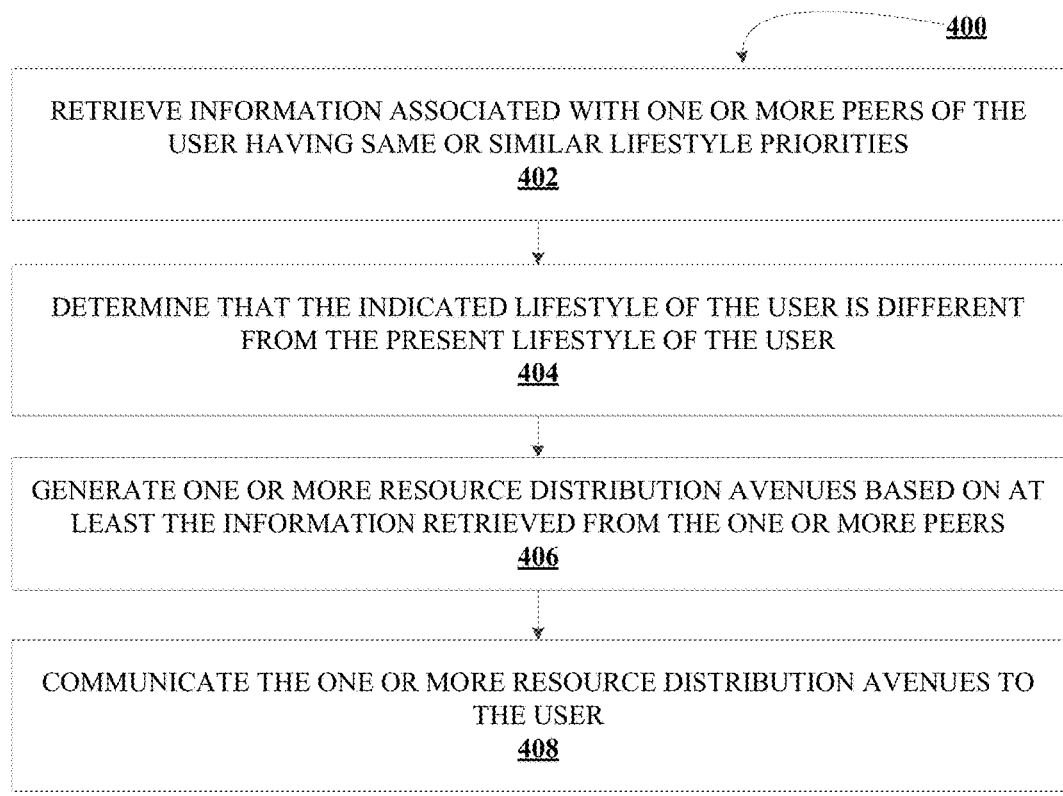
Figure 5:
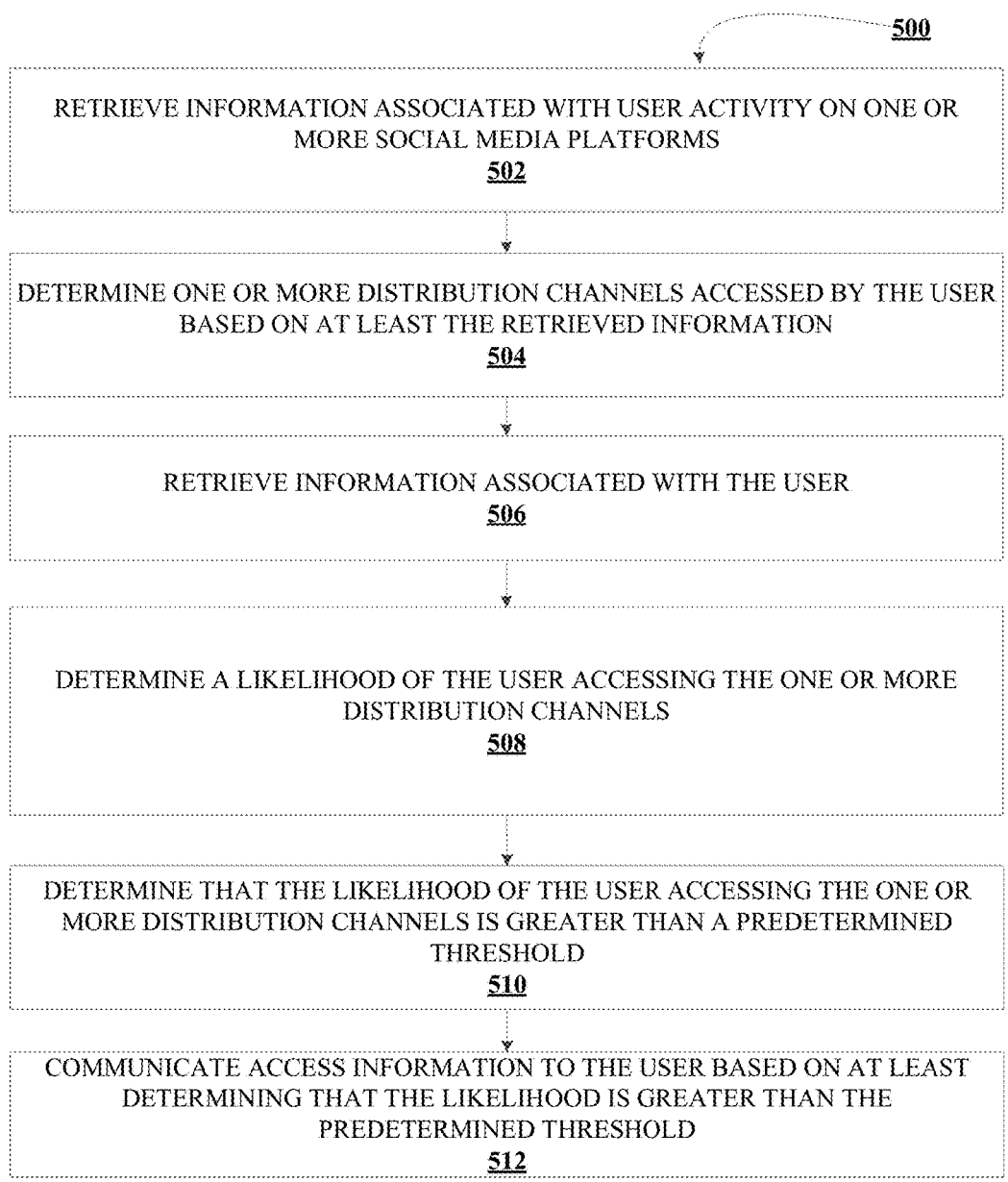
Figure 6:
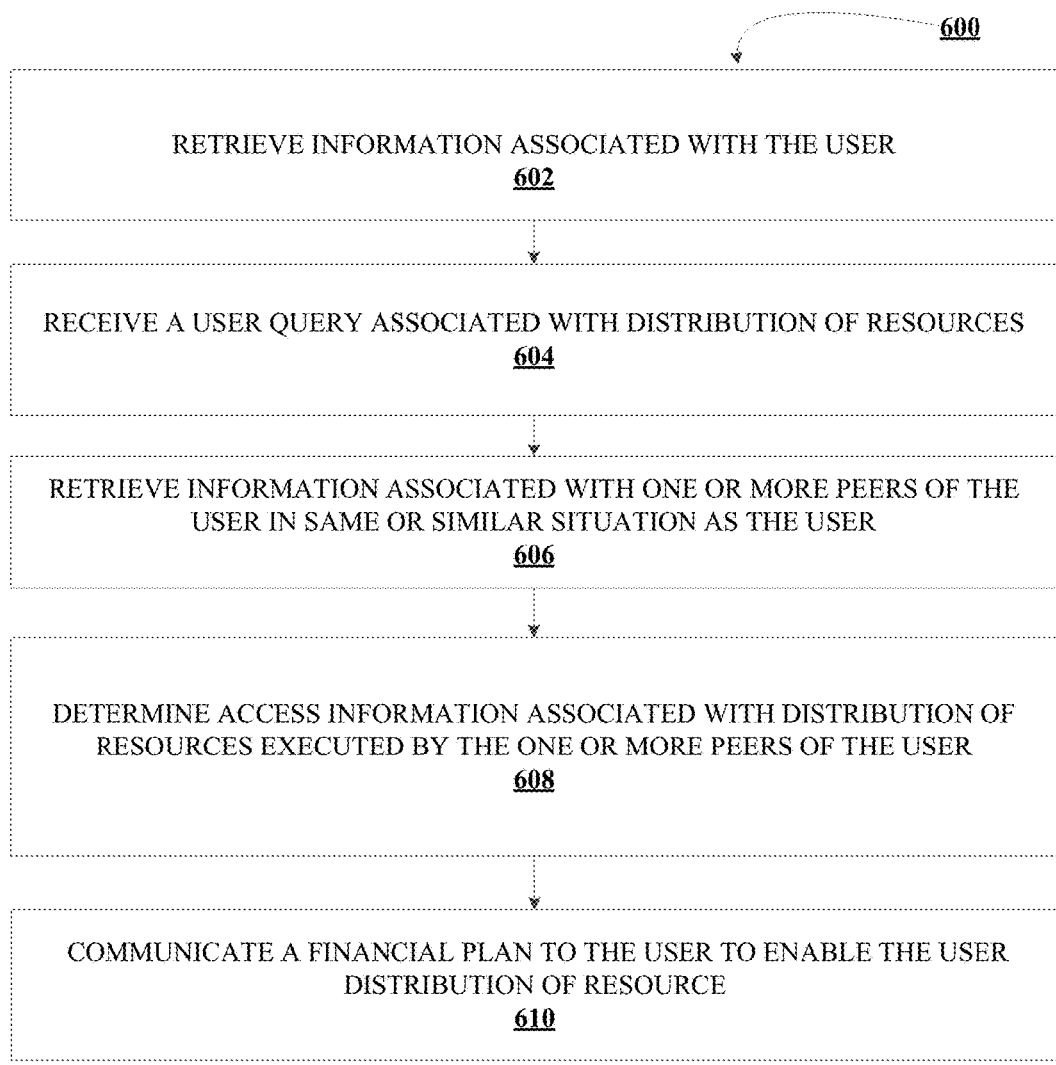
Figure 7:
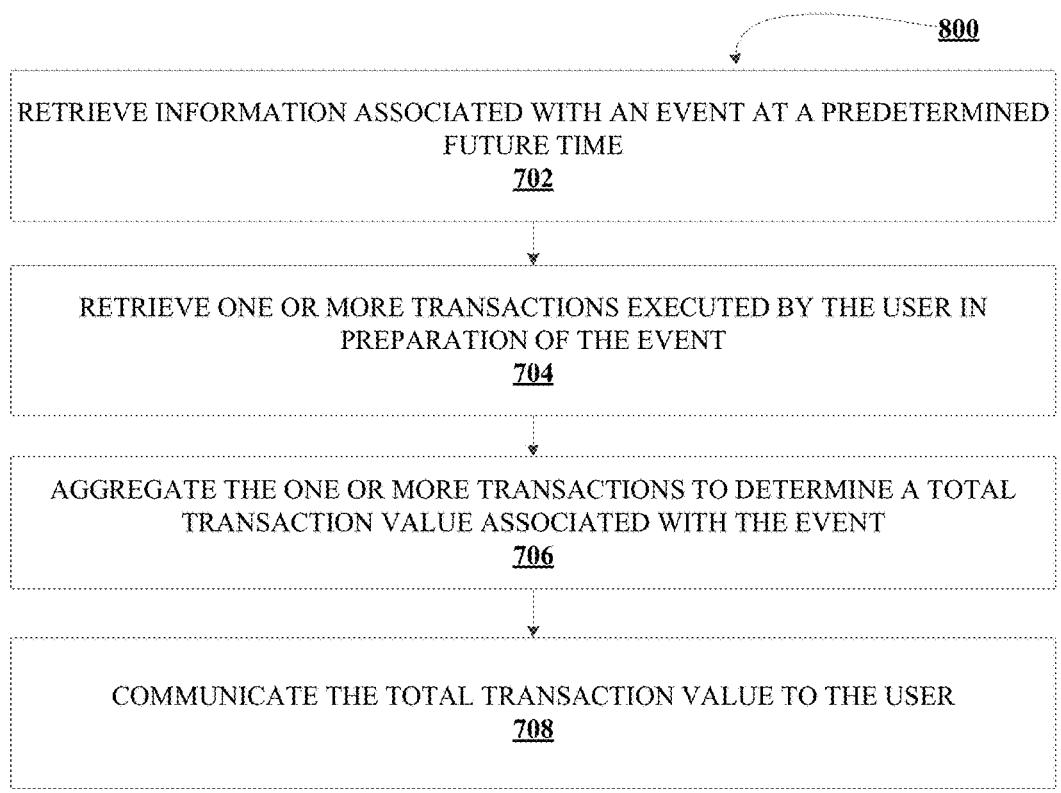
Figure 8:
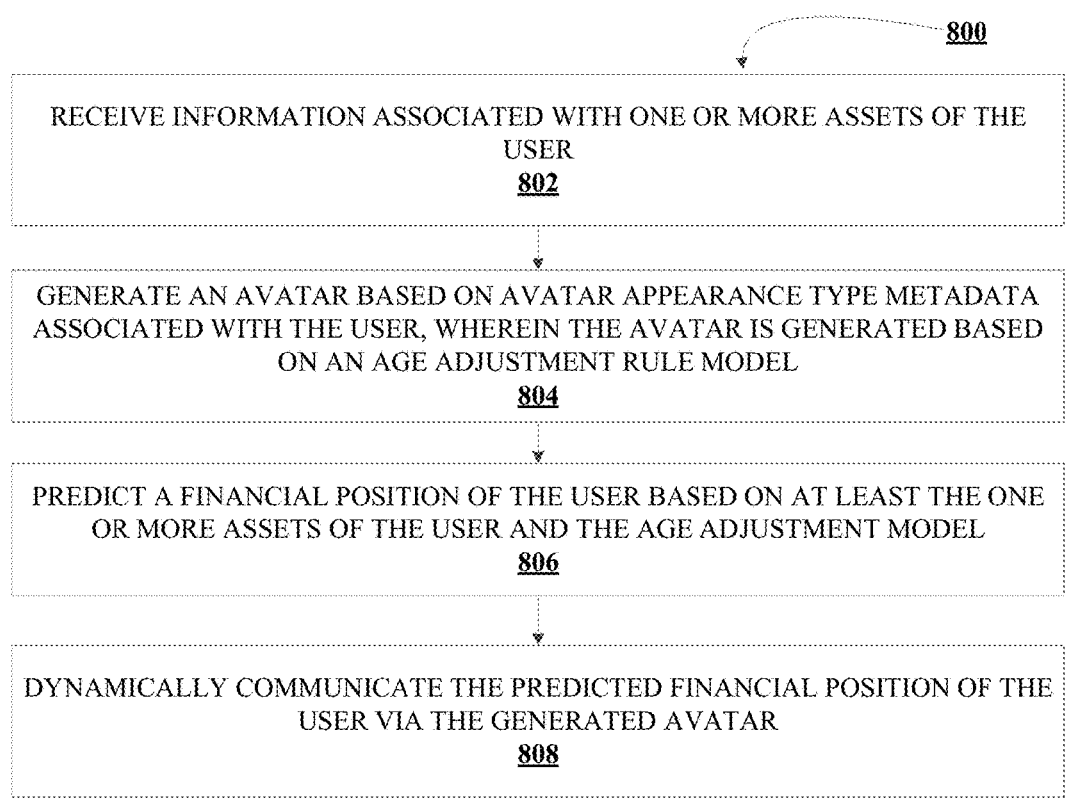
Figure 9:
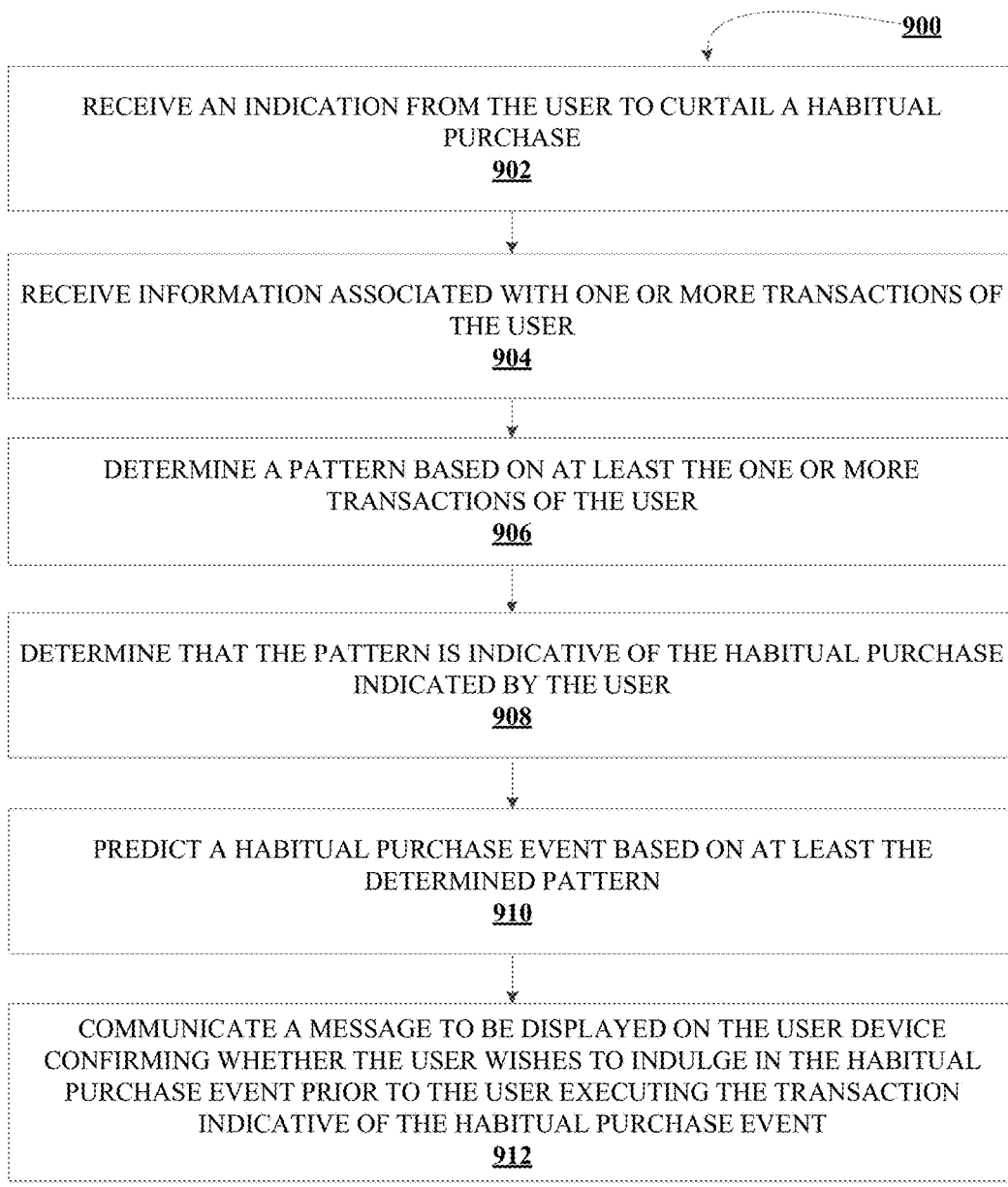
Figure 10:
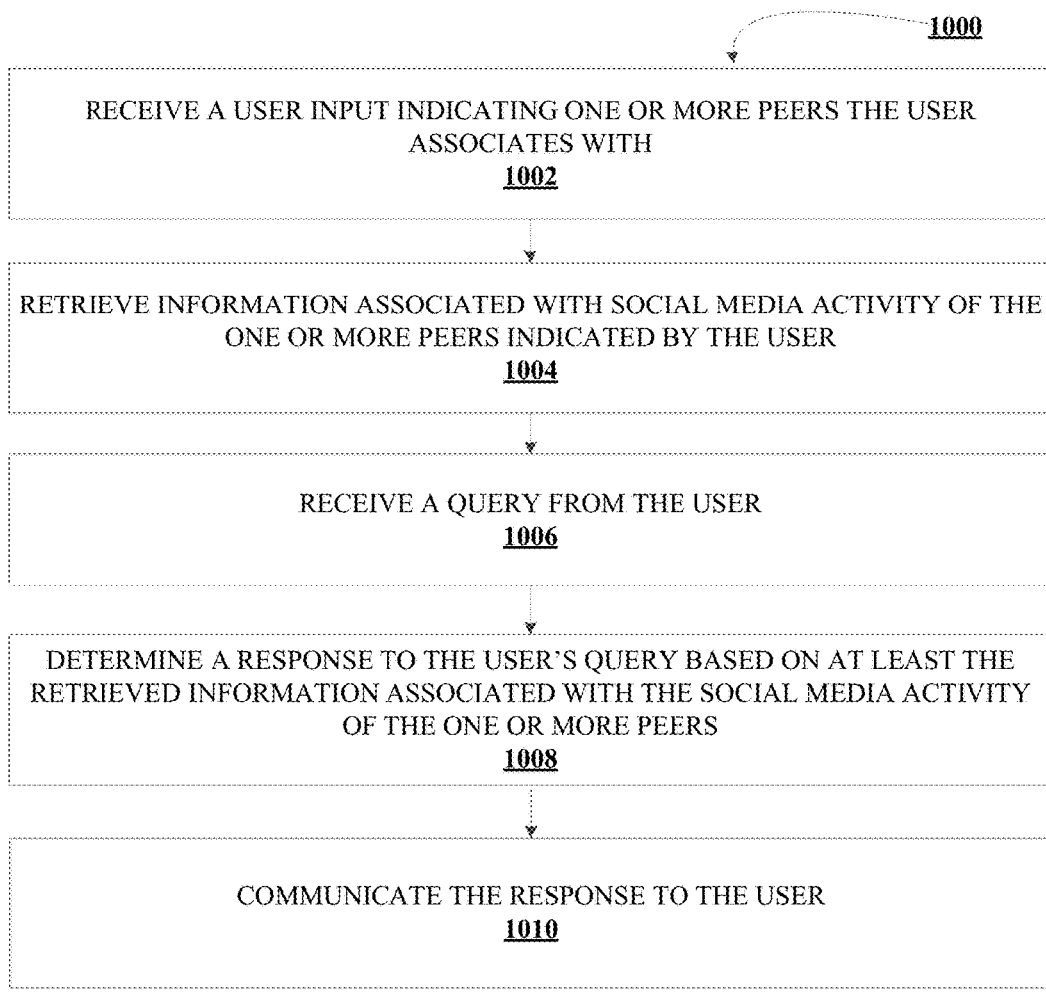

Having thus described embodiments of the invention in general terms, reference will now be made to the accompanying drawings, where:

FIG. 1 illustrates technical components of a system for transfer of resources via a secure channel using an alias, in accordance with an embodiment of the invention;

FIG. 2 illustrates a general process flow for leveraging resources for alternative gains, in accordance with an embodiment of the invention;

FIG. 3 illustrates a general process flow for leveraging social media activity to deliver enriched client experience, in accordance with an embodiment of the invention;

FIG. 4 illustrates a general process flow for bridging the gap between intended resource utilization and actual resource utilization, in accordance with an embodiment of the invention;

FIG. 5 illustrates a general process flow for predicting user actions based on social media activity, in accordance with an embodiment of the invention;

FIG. 6 illustrates a general process flow for correlating resource utilization requirements based on utilization of affiliated resources, in accordance with an embodiment of the invention;

FIG. 7 illustrates a general process flow for resource utilization based on cost-value analysis, in accordance with an embodiment of the invention;

FIG. 8 illustrates a general process flow for predicting resource utilization, in accordance with an embodiment of the invention;

FIG. 9 illustrates a general process flow for correlating resource utilization, in accordance with an embodiment of the invention; and FIG. 10 illustrates a general process flow for resource utilization and recommendation based on predetermined parameters, in accordance with an embodiment of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

In some embodiments of the invention, the invention leverages data gathered regarding user activity to predict future user activity. In this way, the system gathers information associated with the user's social media activity, such as articles that he/she reads, posts liked, and the like. The system also gathers information associated with the user. For example, age, education, employment information, interests, hobbies, financial information, or the like. Accordingly, the system may determine whether the user's social media activity is indicative of someone who may pursue an interest shown by them on social media. For example, if the user is a 60 year old person who has been looking at retirement homes in the southwest, the system may determine a likelihood of the user actually going through with the purchase of a retirement home in the southwest. Accordingly, the system may provide recommendations to the user along the same lines. In this case, the recommendations may be similar retirement facilities in the southwest or equivalent locations. Furthermore, using this information and leveraging peer users' information, the system generates a life priority guidance tool which provides recommendations to the user on how best achieve their lifestyle priorities. This tool may be able to provide the user with answers to questions such as, "what do people like me do to afford a house like this?", "what do people like me do to get into this particular profession?" Furthermore, the system uses this information, specifically the user's social media activity, their indicated lifestyle priorities, and their financial information to provide additional purchase options. For example, if the user has indicated that their lifestyle priority is to reduce their carbon footprint, based on their financial information and social media. Furthermore, the system uses predictive analysis for advertising. In this regard, the present invention generates an avatar that looks like you X years in the future. The system may gather information associated with the user (e.g., lifestyle priorities, financial information, purchasing habits), and provide an outlook of how the user may be X years from now if the user maintains the same or similar course. The system may also provide recommendations about what the user can do in the next X years and show them what they can be if they implemented the recommendations. The avatar may be generated to dynamically vary based on their actions between now and X years. In this way, the present invention may make subtle suggestions to guide the user to plan their future. For example, if the user is going to too many movies and spending XX each time, your future self can say something like, "I see you're spending a bunch of time at the movies, maybe you should stop going so often and spend that money on mortgage for the house."

Embodiments of the invention are directed to systems, methods and computer program products for leveraging social media platforms by analyzing large volumes of data available on social media and extracts key insights to improve product and service development, customer service, customer service, marketing, exposure management, business performance, or the like. In some embodiments, the present invention integrates the social media platform into a proprietary platform associated with the entity to deliver enriched client experiences, such as assisting clients with their lifestyle priorities and the improvement of their financial life.

In some embodiments, an "entity" as used herein may refer to an organization comprising multiple individuals such as an institution or an association that has a collective goal and external environment. Typically, organizations have a management structure that determines relationships between different activities and the members, and subdivides and assigns roles, responsibilities, and authority to carry out different tasks. For purposes of the invention, resources may indicate one or more hardware and/or software available to the user and enables the user to work towards the collective goal of the entity.

In some embodiments, the "user" may be an individual who operates the user input system described herein and is associated with an entity under a contract of employment, either part-time or full-time.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/ output device for communicating with one or more users.

As used herein, a "resource" includes accounts and/or other property that may be made available to the user. In most example implementations contemplated herein, the resource is an ownership interest in a privately-held business entity that is transitioning to be a publicly-held business entity. Consequently, many example implementations envision the "resource" (either in whole or in its constituent parts, as shares of stock, including fractional shares. Notwithstanding the foregoing, the term "resource" need not be artificially limited to the context of stock and/or shares in a business entity, but rather the term "resource" can encompass a broad range of example items, including monetary assets, collections and portions thereof (such as collections of art, possessions, and/or other goods), commodities, accounts, other property, and the like.

As used herein, "social media" or "social media platform" refers to any online social networking platform that enables people to interact with each other over a computer network, e.g., the Internet, and create online communities whose members often share common interests, hobbies, backgrounds, and the like. These services may be web-based and provide various ways for users to interact, such as chat, messaging, email, video, voice chat, file sharing, blogging, discussion groups, and so on. Social networking services may contain directories of categories (e.g., former classmates) and tools to enable users to connect with friends and colleagues.

In the context of example implementations described herein, a "transaction" or "resource distribution" refers to any transfer of resources to and/or from a user. A transaction may refer to a purchase of shares of stock, goods, or and/or other resources.

In some embodiments of the invention, the invention leverages resources for alternative uses. In this way, the system aggregates information associated with a user's assets and provides recommendation to the user on how to leverage his assets to generate additional income. For example, if the user has a brand Y car, recommend that the user may be eligible to drive as a driver for a taxi service. Or, if the user has a three-bedroom house, recommend that the user host on a shared living website. The system may even aggregate information from other users in similar situations to provide a more accurate estimate of their possible additional income.

In some embodiments of the invention, the invention leverages data gathered regarding user activity determine user resource needs. In this way, the invention gathers information associated with the user's social media activity, such as articles that he/she reads, posts he/she likes, or the like. Using this information, the invention determines a category associated with his/her social media activity. Based on this information, the system may then correlate the user's social media activity with one or more of his/her lifestyle priorities. For example, if the user has indicated that he/she likes to travel and that travel is one of his/her lifestyle priorities, the system may leverage the user's social media activity to further fine tune the user's lifestyle priority. Sometimes, what the user says his/her priority is, may not be the actual priority. By leveraging social media activity, the system may determine the user's life priority more accurately. For example, the user has indicated that his/her life priority is being healthy, but his social media activity has posts/text/pictures about baking. The system may then present such information to the user to gather a more accurate perspective about their lifestyle priorities. In this case, the user may be a health food enthusiast that occasionally indulges; in another scenario, the user may be working on recipes that are a healthier form of the conventional baked food. Furthermore, the invention may also determine how closely what the user says is to what they do and accordingly determine an error/deviation rate when categorizing the user according to his/her lifestyle priorities. Additionally, using this information the invention aims to bridge the gap between what the user says he/her lifestyle priorities are and what the lifestyle priorities actually are. The system may aggregate information from peers (other users in similar situations) with similar interests and provide the user with recommendations on how to bridge the gap. For example, if the user has indicated that their lifestyle priority is to eat healthy, but their social media activity indicates otherwise, the present invention provides the user with recommendations about what they might like that can help bring them as close as possible to their lifestyle priority. In one case, if the user's social media activity indicates that they like going to a pastry shop, the recommendation may be based on peer's experience/review who has tried a healthier alternative to sugary foods.

In some embodiments of the invention, the invention leverages data gathered regarding user activity to predict future user activity. In this way, the system gathers information associated with the user's social media activity, such as articles that he/she reads, posts liked, and the like. The system also gathers information associated with the user. For example, age, education, employment information, interests, hobbies, financial information, or the like. Accordingly, the system may determine whether the user's social media activity is indicative of someone who may pursue an interest shown by them on social media. For example, if the user is a 60 year old person who has been looking at retirement homes in the southwest, the system may determine a likelihood of the user actually going through with the purchase of a retirement home in the southwest. Accordingly, the system may provide recommendations to the user along the same lines. In this case, the recommendations may be similar retirement facilities in the southwest or equivalent locations. Furthermore, using this information and leveraging peer users' information, the system generates a life priority guidance tool which provides recommendations to the user on how best achieve their lifestyle priorities. This tool may be able to provide the user with answers to questions such as, "what do people like me do to afford a house like this?", "what do people like me do to get into this particular profession?" Furthermore, the system uses this information, specifically the user's social media activity, their indicated lifestyle priorities, and their financial information to provide additional purchase options. For example, if the user has indicated that their lifestyle priority is to reduce their carbon footprint, based on their financial information and social media. Furthermore, the system uses predictive analysis for advertising. In this regard, the present invention generates an avatar that looks like you X years in the future. The system may gather information associated with the user (e.g., lifestyle priorities, financial information, purchasing habits), and provide an outlook of how the user may be X years from now if the user maintains the same or similar course. The system may also provide recommendations about what the user can do in the next X years and show them what they can be if they implemented the recommendations. The avatar may be generated to dynamically vary based on their actions between now and X years. In this way, the present invention may make subtle suggestions to guide the user to plan their future. For example, if the user is going to too many movies and spending XX each time, your future self can say something like, "I see you're spending a bunch of time at the movies, maybe you should stop going so often and spend that money on mortgage for the house."

In some embodiments of the invention, the invention utilizes resources based on cost-value analysis. In this way, the invention ties in historical purchases with future goals. For example, the user's social media activity has indicated that the user is training for a marathon in a city; the user's financial information indicates that the user bought shoes, flight tickets to the city, has taken pictures and posted his training on social media. After a successful completion of the marathon, the system may ask the user to rate their experience and its value for it to be displayed on social media. Was the marathon worth it? What value does it have relative to its cost? The system may also generate a photo album of the activity and post it to show the experience that their purchase brought them. The system envisions a new valuing factor for an activity that acts as a multiplier to the cost of the activity based on the user's subjective feelings regarding the activity. This information can be provided to other user's or back to merchants associated with the activity to help in better valuing the experience.

In some embodiments, the invention utilizes resources and recommendations based on predetermined parameters. In this way, the invention gathers information associated with the user and a specific set of people that the user associated with. When the user is attempting to make a decision. The system may gather information from social media activity of the specific set of people the user associates with and provide the user with a list of restaurants to go to. In some embodiments, the system may aggregate user experiences from their financial activity directly from the user instead of aggregating them from other social media platforms. For example, I see you ate at a restaurant yesterday, how would you rate it? This information may be aggregated to give the user's peers recommendation on similar activities. In another embodiment, if the user wishes to go out to eat dinner, but is on a specific budget, the present invention can provide reviews and information based on what the user's peers/friends did recently within that budget. In yet another embodiment, if the closest bank location to the user is X, but the reviews from other people (peers) about X talks about issues with parking, long lines, or the like the user may be informed before going to the location, about possible positive/negative issues associated with going there and can help them plan accordingly. In some cases, the system may provide recommendations for alternate banking facilities.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

FIG. 2 illustrates a general process flow for leveraging resources for alternative gains 200, in accordance with an embodiment of the invention. As shown in block 202, the process flow includes retrieve information associated with one or more assets of the user. As used herein, "assets" include accounts of the user and/or other property owned by the user. The assets may be associated with accounts or may be property that is not associated with a specific account. Examples of assets associated with accounts may be accounts that have cash or cash equivalents, or accounts that are funded with or contain property, such as safety despots box account that jewelry, a trust account that is funded with property, or the like. Examples of assets that may not be associated with accounts may be antiques in a user's home, jewelry in a user's home, or the like. In this regard, the resource capacity associated with the assets may be asset values. Typically, an asset value may be defined as the value of the difference between an entity's assets and its liabilities. As used herein, "liabilities" are cash or cash equivalent debt that a user may owe to an entity. Examples of liabilities may include a home mortgage, another type of loan for which the user has to make payments, payments owed to the government, a legal judgment against the user, or any other situation in which the use owes a debt to another entity or person.

In some embodiments, the user's assets may include but are not limited to checking accounts, savings accounts, investment accounts (e.g., with regular disbursements and penalties for principal withdrawals, or self-directed accounts that are liquid without penalties), annuity accounts (e.g., social security, claim awards, reverse mortgages, or the like), insurances benefit accounts (e.g., one time or reoccurring), property owned by the user (e.g., investment property, rental property, or the like), or other like assets that may provide regular or semi-regular recurring payments, assets that are or are similar to cash accounts, or assets that need to be sold in order to realize cash values of the assets. In some embodiments the assets may be illiquid (e.g., have penalties or may take time to convert into cash) or may be liquid (e.g., can be converted to cash immediately or within hours, days, or the like without penalty). In addition, embodiments of the invention further comprise determining a user's liabilities and the values (e.g., amount of debt, or the like) of the liabilities (e.g., amount owed, or the like). The user's liabilities may include a mortgage, long and short term debt (e.g., credit card debt, car loans, boat loans, small business loans, lines of credit, or the like), payments owed on other personal property or legal judgments against the user, or the like.

Next, as shown in block 204, the process flow includes determining one or more resource aggregation options based on at least the received information. In this regard, the system may be configured to determine one or more aggregation options using which the user may leverage the one or more assets to generate additional income. For example, if the user's assets includes a high end vehicle, the one or more resource aggregation options may include driving for a transportation network service under its luxury brand. In another example, if the user's assets includes a three bedroom vacation house, the one or more aggregation options may include setting up the vacation house on a peer-to-peer online marketplace and homestay network for additional income. In some embodiments, the system may be configured to determine one or more resource aggregation options executed by one or more peers of the user. In one aspect, the system may be configured to determine one or more peers of the user with same or similar user profile as that of the user. In this regard, the system may be configured to determine the user profile based on at least one or more past transactions of the user, a geographic location of the user, an income level, an amount of outgoing funds, asset values, liability values, asset types, spending habits, saving habits or the like. In one aspect, the user profile includes at least information identifying the user. In some embodiments, the system may be configured to establish predefined user profiles including, but not limited to travel profiles, homebody, luxury spender, thrifty saver, risk taker, or the like. For example, for the thrifty saver lifestyle the user may indicate that he/she may downsize the user's home in retirement, sell a vacation home, reduce travel expenses, or the like. The profiles may be pre-programmed by the financial institution and/or programmable by the user to illustrate how the user plans on living in retirement. Other lifestyles illustrate if the user will spend less, the same, or more during retirement.

In some embodiments, the system may be configured to enable the user to customize the user profile. In this regard, the system may be configured to enable the user to select at least one of the predetermined user profiles and customize the at least one selected user profile according to the characteristics of the user by providing additional information. In one aspect, the system may be configured to initiate presentation of one or more options to enable the user to provide the additional information to customize the selected predetermined user profile.

Next, as shown in block 206, the process flow includes initiating a presentation of a recommendation interface for display on a user computing device, wherein the recommendation interface comprises the one or more resource aggregation options. In response, the process flow includes receiving a user selection of at least one of the one or more resource aggregation options, as shown in block 208.

In response to receiving the user selection, the process flow includes executing the at least one of the one or more resource aggregation options selected by the user, as shown in block 210. In this regard, the system may be configured to determine one or more mobile applications associated with the at least one of the one or more resource aggregation options selected by the user. In response, the system may be configured to download the one or more mobile applications to be stored on the computing device of the user. In one aspect, the system may be configured to initiate a setup of the resource aggregation options via the one or more mobile applications.

FIG. 3 illustrates a general process flow for leveraging social media activity to deliver enriched client experience 300, in accordance with an embodiment of the invention. As shown in block 302, the process flow includes retrieving information associated with one or more user inputs indicating a lifestyle priority. In this regard, the system may be configured to receive a user input indicating a lifestyle priority. Examples of lifestyle priorities may be family, finances, health, home, leisure, charity, or the like. Accordingly, the system may then determine a first user category based on at least the retrieved information, as shown in block 304.

Next, as shown in block 306, the process flow includes monitoring one or more actions executed by the user on one or more social media platforms indicating a present lifestyle of the user. In this regard, the system may be configured to aggregate information associated with the user's social media activity, i.e., articles that he reads, posts he likes, etc., and determine a category associated with his social media activity. Based on this information, the system may then correlate the user's social media activity with one or more of his lifestyle priorities. For example, if the user has indicated that he likes to travel and that travel is one of his lifestyle priorities, the system may leverage the user's social media activity to further fine tune the user's lifestyle priority.

In some embodiments, the user's social media activity may not be indicative of the user's indicated lifestyle priority. For example, the user has indicated that his life priority is being healthy, but his social media activity has posts/text/pictures about baking. The system may then present such information to the user to gather a more accurate perspective about their lifestyle priorities. In this case, the user may be a health food enthusiast that occasionally indulges in baking. In another aspect, the user may be working on recipes that are a healthier form of conventional baked food.

In some embodiments, the system may be configured to continuously monitor the discrepancy between the user's social media activity and the one or more lifestyle priorities indicated by the user. In doing so, the system may be configured to determine an error rate. Accordingly, the system may be configured to re-categorize the user into a second user category based on at least the one or more actions indicating the present lifestyle of the user, as shown in block 308.

FIG. 4 illustrates a general process flow for bridging the gap between intended resource utilization and actual resource utilization 400, in accordance with an embodiment of the invention. As shown in block 402, the process flow includes retrieving information associated with one or more peers of the user having same or similar lifestyle priorities. Next, the process flow includes determining that the indicated lifestyle of the user is different from the present lifestyle of the user, as shown in block 404.

In response to determining the discrepancy between the indicated lifestyle priorities and the present lifestyle priorities, the system may be configured to generate one or more resource distribution avenues based on at least the information retrieve from the one or more peers, as shown in block 406. In this regard, the system may be configured to establish a communication link with one or more computing devices associated with the one or more peers and retrieve the information via the communication link. In some embodiments, the system may be configured to system may aggregate information from peers (other users in similar situations) with similar interests and provide the user with recommendations on how to bridge the gap. In response, the system may be configured to communicate the one or more resource distribution avenues to the user, as shown in block 408. In this regard, the system may be configured to initiate a presentation of a recommendation interface for display on the user computing device.

For example, if the user has indicated that their lifestyle priority is to eat healthy, but their social media activity indicates otherwise, the system may be configured to provide the user with recommendations about what they might like that can help bring them as close as possible to their lifestyle priority. In one case, if the user's social media activity indicates that they like going to a pastry shop, the recommendation may be based on peer's experience/review who has tried a healthier alternative to sugary foods.

FIG. 5 illustrates a general process flow for predicting user actions based on social media activity 500, in accordance with an embodiment of the invention. As shown in block 502, the process flow includes retrieving information associated with user activity on one or more social media platforms. In some embodiments, social media platforms can be any social media or different types of information sources including, but not limited to, networks, websites, or computer enabled systems. The system may be configured to communicate with one or more social media platforms associated with the user. In one aspect, the system may be configured to establish a communicable link with the one or more social media platforms. In this regard, the system may be configured with communication capability to communicate with sites (i.e., web-servers or server clusters via http formatted request and response protocols) corresponding to the one or more social media platforms.

Next, as shown in block 504, the process flow includes determining one or more distribution channels accessed by the user based on at least the retrieved information. In some embodiments, the distribution channels may include one or more research avenues explored by the user. For example, a user's social media activity may indicate that the user is in the market for a new car. In one aspect, the user may have recently visited multiple web-pages associated with multiple car manufacturers via one or more social media platforms. In another aspect, the user may have recently discussed purchasing options with one or more peers virtually connected with the user via social media platforms.

In response, the system may be configured to retrieve information associated with the user, as shown in block 506. In some embodiments, the information associated with the user may include one or more lifestyle priorities indicated by the user. In some other embodiments, the information associated with the user may include user profile information. In yet another embodiment, the information associated with the user may include asset information of the user. For example, the user may have indicated a lifestyle priority to include traveling with minimal carbon footprint. In addition, the user may have recently moved to a different geographical area to begin new employment requiring a considerable commute.

Accordingly, the system may be configured determine a likelihood of the user selection of one or more distribution channels, as shown in block 508. In this regard, the system may be configured to aggregate the information received to determine a correlation in the pattern of information. Based on the above example, the system may be configured to determine a likelihood of the user purchasing a vehicle. In this regard, the system may be configured to determine that the likelihood of the user accessing the one or more distribution channels is greater than a predetermined threshold, as shown in block 510.

In response, the system may be configured to communicate access information to the user based on at least determining that the likelihood is greater than the predetermined threshold, as shown in block 512. In one aspect, the threshold may be determined by the entity. In another aspect, the threshold may be customizable by the user. Based on the above example, the system may determine that the likelihood of the user buying a car is greater than the predetermined threshold based on the user's recent relocation, commute time, or the like. In response, the system may be configured to consider the user's indicated life priority and asset information to recommend a vehicle for purchase. In this case, based on the user's account balance, the system may recommend an electric car which caters to the user's lifestyle priority of minimizing carbon footprint.

FIG. 6 illustrates a general process flow for correlating resource utilization requirements based on utilization of affiliated resources 600, in accordance with an embodiment of the invention. As shown in block 602, the process flow includes retrieving information associated with the user. As described herein, information associated with the user may be based on at least the user profile, user assets and liabilities, social media activity, or the like. Next, as shown in block 604, the process flow includes receiving a query associated with the distribution of resources. In some embodiments, the distribution of resources may be associated with a goal. In some embodiments, the query may be associated with optimal distribution of user resources to achieve the goal.

Next, as shown in block 606, the process flow includes retrieving information associated with one or more peers of the user in same or similar situation as the user. As described herein, the system may be configured to compare one or more portions of a user profile associated with a user to one or more substantially similar portions of one or more user profiles associated with individuals within the user's peer group. A peer group may represent one or more individuals similarly situated with a user relative to one or more age groups, income, debt, debt-to-income ratios, demographic profile, location, gender, and/or any other peer-related benchmarks.

In some embodiments, the one or more peers of the user may be determined based on one or more same or similar goals of the one or more peers. As shown in block 608, the process flow then includes determining access information associated with distribution of resources executed by one or more peers of the user. In this regard, the system may be configured to determine the distribution of resources executed by the one or more peers of the user to achieve the same or similar goals. Accordingly, the system may be configured to generate an available financial plan. In one aspect, an available financial plan may include a potential course of action to assist a user in achieving one or more goals. A course of action may include investment, saving, and/or spending options. An available financial plan may be based on a user profile and/or the result of a peer group comparison.

In response, the process flow includes communicating the financial plan to the user to enable the user distribution of the resource, as shown in block 610. In various embodiments, a user may accept and/or select one of the one or more available financial plans created by the system and communicated to the user. Accordingly, the system may be configured to implement the financial plan selected by the user. In some embodiments, to implement the financial plan, the system may create one or more documents (e.g., credit card application, loan application, checking account application, 401K application, Individual Retirement Account ("IRA") application, and/or other like documents) to assist in transferring information to the entity or any other entity associated with the implemented financial plan.

FIG. 7 illustrates a general process flow for resource utilization based on cost-value analysis 700, in accordance with an embodiment of the invention. As shown in block 702, the process flow includes receiving information associated with an event at a predetermined future time. In some embodiments, the information may indicate that the event is to be executed by the user. In one aspect, executing the event includes a user participation in at least a portion of the event. In some embodiments, the system may be configured to retrieve the information based on the user's social media activity. Next, as shown in block 704, the process flow includes retrieving one or more transactions executed by the user in preparation of the event. Next, as shown in block 706, the process flow includes aggregating the one or more transactions to determine a total transaction value associated with the event. In response to determining a total transaction value, the process flow includes communicating the total transaction value to the user, as shown in block 708.

In one example, the user may have indicated, via social media activity, that the user is training for a marathon in a city. The system may then monitor the user's financial information to determine which of the one or more purchases executed by the user is associated with the indicated event. In this regard, the system may be configured to determine a likelihood associated with the purchase indicating a relationship of the transaction is to the indicated event. In this example, the financial information of the user may include flight tickets to the city around the marathon dates. Another transaction may be running shoes purchased by the user. Yet another transaction include a membership to a local running club. Accordingly, the system may be configured to aggregate the purchases with a likelihood greater than a predetermined threshold.

In some embodiments, after the indicated event has transpired, the system may be configured to receive a user feedback associated with the event. In response, the system may dynamically generate an event document indicating the aggregated transaction value associated with the event. In some embodiments, the event document may include a total transaction value, a compilation of social media activity of the user leading up to and in course of the user execution of the event, comparable activity and experiences of one or more peers of the user, or the like.

FIG. 8 illustrates a general process flow for predicting resource utilization 800, in accordance with an embodiment of the invention. As shown in block 802, the process flow includes receiving information associated with one or more assets of the user. Next, the process flow includes generating an avatar based on avatar appearance type metadata associated with the user, wherein the avatar is generated based on an age adjusted rule model, as shown in block 804. In some embodiments, the avatar appearance type metadata may include at least one of skin information, hair information, nails information, and teeth information of the user. Next, the process flow includes predicting a financial position of the user based on at least the one or more assets of the user and the age adjustment model, as shown in block 806. In response to predicting the financial position of the user, the process flow includes dynamically communicating the predicted financial position of the user via the generated avatar, as shown in block 808.

In some embodiments, the system may be configured to generate an avatar that resembles the user X years into the future. In one aspect, the system may be configured to gather information associated with the user (e.g., lifestyle priorities, financial information, purchasing habits), and provide an outlook of how the user may be X years from now if the user maintains the same or similar course. The system may also provide recommendations about what the user can do in the next X years and show them what they can be if they implemented the recommendations. The avatar may be generated to dynamically vary based on their actions between now and X years. In this way, the present invention may make subtle suggestions to guide the user to plan their future. For example, if the client is going to too many movies and spending $10 each time, the avatar resembling the user's future self may be configured to communicate a message to the user, indicating an alternate avenue for distribution of the resource which may be more beneficial to the user.

FIG. 9 illustrates a general process flow for correlating resource utilization 900, in accordance with an embodiment of the invention. As shown in block 902, the process flow includes receiving an indication from the user to curtail a habitual purchase. Next, as shown in block 904, the process flow includes receiving information associated with one or more transactions of the user. In response, the process flow includes determining a pattern based on at least the one or more transactions of the user, as shown in block 906. Next, the process flow includes determining that the pattern is indicative of the habitual purchase indicated by the user, as shown in block 908. In response, as shown in block 910, the process flow includes predicting a habitual purchase event based on at least the determined pattern. In response, the process flow includes communicating a message to be displayed on the user device confirming whether the user wishes to indulge in the habitual purchase event prior to the user executing the transaction indicative of the habitual purchase event, as shown in block 912.

In some embodiments, the system may be configured to determine a transaction proximity score associated with the user. The transaction proximity score is a quantification of how similar the user transaction is to one or more transactions that were executed by the user. Determining the transaction proximity score may be done in a variety of methods. For example, in some embodiments, determining the transaction proximity score includes determining a time that has lapsed since completion of the one or more transactions. Next, a proximity threshold associated with the one or more transactions and the elapsed time may be determined. This may be done by accessing a database that includes a listing of pairs and/or ranges of proximity thresholds and/or elapsed times. Then, the proximity threshold is used to determine whether the user's transaction falls within the proximity threshold. For example, if the user performed a transaction every day within a specific geographic area, a time frame, a specific merchant, or the like, then a proximity threshold may be generated for each variable accordingly. In some embodiments, the proximity threshold may be based on a combination of one or more variables identified. In such a case, because the user's transaction falls within the proximity threshold of a time window, then an appropriate transaction proximity score may be assigned.

In various embodiments, determining the transaction proximity score comprises determining a historical transaction pattern associated with the user; determining whether the transaction set of data indicates a current transaction pattern that falls within a predetermined acceptable variance of the historical transaction pattern; and, if not, determining the transaction proximity score based at least in part on a variance of the current transaction pattern from the historical transaction pattern. In other embodiments, determining the transaction proximity score comprises determining a historical transaction pattern associated with the user; and determining the transaction proximity score based at least in part on a variance of the current transaction pattern from the historical transaction pattern.

FIG. 10 illustrates a general process flow for resource utilization and recommendation based on predetermined parameters 1000, in accordance with an embodiment of the invention. As shown in block 1002, the process flow includes receiving a user input indicating one or more peers the user associates with. In this regard, the system may be configured to initiate a presentation of a user interface for display on the user computing device. In one aspect, the user interface includes one or more peers of the user. In response, the system may be configured to receive from the user, a selection of one or more peers that the user associates himself/herself with.

Next, as shown in block 1004, the process flow includes retrieving information associated with the social media activity of the one or more peers indicated by the user. In some embodiments, the one or more peers selected by the user may be associated with the user via one or more social media platforms. In other embodiments, the one or more peers may not be associated with the user via the one or more social media platforms. Next, as shown in block 1006, the process flow includes receiving a query from the user. In response, the system may be configured to determine a response to the user's query based on at least the retrieved information associated with the social media activity of the one or more peers, as shown in block 1008.

In response to determining a response, the process flow includes communicating the response to the user, as shown in block 1010. In some embodiments, the system may be configured to gather information associated with the user and the specific set of people that the user associates himself/herself with. In one example, when the user is attempting to make a decision (e.g., using a smart/intelligence personal assistant, "where do I go get dinner tonight?"), the system may be configured to gather information from social media activity of the specific set of people the user associates with and provide the user with a list of restaurants to go to. In some embodiments, the system may aggregate user experiences from their financial activity directly from the user instead of aggregating them from other social media platforms. For example, "I see you ate at XX restaurant yesterday, how would you rate your experience?" This information may be aggregated to provide the user with a recommendation based on the ratings of one or more peers selected by the user on similar activities. In another embodiment, if the user wishes to go out to eat dinner, but is on a specific budget, the system may be configured to provide reviews and information based on what the user's peers/friends did recently within that budget. In this regard, the system may be configured to access the financial information of the peers. In yet another embodiment, if the closest bank location to the user is X, but the reviews from other people (peers) about X details issues with parking, long lines, or the like, the user may be informed before going to the location, about possible positive/negative issues associated with going there and can help them plan accordingly. In some cases, the system may provide recommendations for alternate banking facilities.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 7722US1.014033.2999 | 15/463,434 | SYSTEM FOR PLATFORM ACTIVITY GATHERING FOR ALTERNATIVE RESOURCE GENERATION | Concurrently herewith |
| 7652US1.014033.2984 | 15/463,444 | SYSTEM FOR PLATFORM ACTIVITY GATHERING FOR DETERMINING CURRENT USER RESOURCE REQUIREMENTS | Concurrently herewith |
| 7654US1.014033.2986 | 15/463,449 | RESOURCE AND EXPERIENCE FACTOR VALUE GENERATION SYSTEM | Concurrently herewith |
| 7655US1.014033.2987 | 15/463,515 | CORRELATING RESOURCE UTILIZATION REQUIREMENTS BASED ON UTILIZATION OF AFFILIATED RESOURCES | Concurrently herewith |

What is claimed is:

1. A system for network platform activity leverage virtual visualization alteration, the system comprising:
    a memory device with computer-readable program code stored thereon;
    a communication device;
    a processing device operatively coupled to the memory device and the communication device, wherein the processing device is configured to execute the computer-readable program code to:
        identify user activity across network platforms, wherein identifying user activity across network platforms comprises integrating network monitoring modules for identifying user activity on one or more social media platforms;
        extract user activity across network platforms and categorize the user activity;
        pair extracted user activity across network platforms with user information;
        leverage user activity across network platforms and user information for identification of user trends;
        generate a virtual visualization simulator for user access via a secure communication portal illustrating the user at a predetermined future time, wherein the virtual visualization simulator illustrates a financial position of the user based on the user activity across network platforms and user information;
        receive one or more inputs from the user via a user interface communicated via the secure communication portal; and
        adjust the virtual visualization simulator for illustration of the inputs to dynamically communicate a predicted financial position of the user via the virtual visualization simulator based on the one or more inputs, user activity across network platforms, and user information.

2. The system of claim 1, further comprising extracting priority event data for the one or more user peers that obtained a priority event and adjusting the virtual visualization simulator to illustrate steps required by the one or more user peers to achieve the priority event.

3. The system of claim 1, further comprising updating categorization of the user activity based on a monitoring of the user activity across network platforms using network monitoring modules.

4. The system of claim 1, wherein identifying user activity across network platforms further comprises identifying user posts and likes on one or more social media platforms.

5. The system of claim 1, wherein user information further comprises user age and interests.

6. The system of claim 1, wherein receiving one or more inputs from the user further comprises an indication of a user future priority event, wherein the user priority event is an activity or location the user desires to obtain in the future.

7. The system of claim 1, wherein the virtual visualization simulator further comprises an avatar of the user in a future setting at a predetermined future time simulating the user based on the user activity across network platforms and user information.

8. A computer program product for network platform activity leverage virtual visualization alteration, the computer program product comprising at least one non-transitory computer-readable medium having computer-readable program code portions embodied therein, the computer-readable program code portions comprising:
    an executable portion configured for identifying user activity across network platforms, wherein identifying user activity across network platforms comprises integrating network monitoring modules for identifying user activity on one or more social media platforms;
    an executable portion configured for extracting user activity across network platforms and categorize the user activity;
    an executable portion configured for pairing extracted user activity across network platforms with user information;
    an executable portion configured for leveraging user activity across network platforms and user information for identification of user trends;
    an executable portion configured for generating a virtual visualization simulator for user access via a secure communication portal illustrating the user at a predetermined future time, wherein the virtual visualization simulator illustrates a financial position of the user based on the user activity across network platforms and user information;
    an executable portion configured for receiving one or more inputs from the user via a user interface communicated via the secure communication portal; and
    an executable portion configured for adjusting the virtual visualization simulator for illustration of the inputs to dynamically communicate a predicted financial position of the user via the virtual visualization simulator based on the one or more inputs, user activity across network platforms, and user information.

9. The computer program product of claim 8, further comprising an executable portion configured for extracting priority event data for the one or more user peers that obtained a priority event and adjusting the virtual visualization simulator to illustrate steps required by the one or more user peers to achieve the priority event.

10. The computer program product of claim 8, further comprising an executable portion configured for updating categorization of the user activity based on a monitoring of the user activity across network platforms using network monitoring modules.

11. The computer program product of claim 8, wherein identifying user activity across network platforms further comprises identifying user posts and likes on one or more social media platforms.

12. The computer program product of claim 8, wherein user information further comprises user age and interests.

13. The computer program product of claim 8, wherein receiving one or more inputs from the user further comprises an indication of a user future priority event, wherein the user priority event is an activity or location the user desires to obtain in the future.

14. The computer program product of claim 8, wherein the virtual visualization simulator further comprises an avatar of the user in a future setting at a predetermined future time simulating the user based on the user activity across network platforms and user information.

15. A computer-implemented method for network platform activity leverage virtual visualization alteration, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
   identifying user activity across network platforms, wherein identifying user activity across network platforms comprises integrating network monitoring modules for identifying user activity on one or more social media platforms;
   extracting user activity across network platforms and categorize the user activity;
   pairing extracted user activity across network platforms with user information;
   leveraging user activity across network platforms and user information for identification of user trends;
   generating a virtual visualization simulator for user access via a secure communication portal illustrating the user at a predetermined future time, wherein the virtual visualization simulator illustrates a financial position of the user based on the user activity across network platforms and user information;
   receiving one or more inputs from the user via a user interface communicated via the secure communication portal; and
   adjusting the virtual visualization simulator for illustration of the inputs to dynamically communicate a predicted financial position of the user via the virtual visualization simulator based on the one or more inputs, user activity across network platforms, and user information.

16. The computer-implemented method of claim 15, further comprising extracting priority event data for the one or more user peers that obtained a priority event and adjusting the virtual visualization simulator to illustrate steps required by the one or more user peers to achieve the priority event.

17. The computer-implemented method of claim 15, further comprising updating categorization of the user activity based on a monitoring of the user activity across network platforms using network monitoring modules.

18. The computer-implemented method of claim 15, wherein identifying user activity across network platforms further comprises identifying user posts and likes on one or more social media platforms.

19. The computer-implemented method of claim 15, wherein receiving one or more inputs from the user further comprises an indication of a user future priority event, wherein the user priority event is an activity or location the user desires to obtain in the future.

20. The computer-implemented method of claim 15, wherein the virtual visualization simulator further comprises an avatar of the user in a future setting at a predetermined future time simulating the user based on the user activity across network platforms and user information.

\* \* \* \* \*